United States Patent
Tanogashira et al.

(10) Patent No.: US 10,267,025 B2
(45) Date of Patent: Apr. 23, 2019

(54) WET AREA DEVICE

(71) Applicant: TOTO LTD., Kitakyushu-shi, Fukuoka (JP)

(72) Inventors: Yuta Tanogashira, Kitakyushu (JP); Shoichi Tsuiki, Kitakyushu (JP); Masami Tsujita, Kitakyushu (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 0 days.

(21) Appl. No.: 15/460,395

(22) Filed: Mar. 16, 2017

(65) Prior Publication Data
US 2017/0275863 A1    Sep. 28, 2017

(30) Foreign Application Priority Data

Mar. 23, 2016  (JP) ................................ 2016-058848

(51) Int. Cl.
| | | |
|---|---|---|
| *E03D 5/10* | (2006.01) | |
| *G01F 1/66* | (2006.01) | |
| *G01S 13/56* | (2006.01) | |

(52) U.S. Cl.
CPC .............. *E03D 5/105* (2013.01); *G01F 1/66* (2013.01); *G01S 13/56* (2013.01)

(58) Field of Classification Search
CPC ............ E03D 5/105; G01S 13/04; G01F 1/66
See application file for complete search history.

(56) References Cited

U.S. PATENT DOCUMENTS

| | | | |
|---|---|---|---|
| 6,250,601 B1 * | 6/2001 | Kolar ...................... | E03C 1/057 251/129.04 |
| 8,250,680 B2 * | 8/2012 | Murata ................... | E03D 5/105 251/129.04 |
| 2005/0022292 A1 * | 2/2005 | Choi ........................ | E03D 9/08 4/300 |
| 2005/0114992 A1 | 6/2005 | Todoroki | |

* cited by examiner

*Primary Examiner* — Janie M Loeppke
(74) *Attorney, Agent, or Firm* — Pearne & Gordon LLP

(57) ABSTRACT

A sanitary device includes a wet area device includes a radio wave sensor, a control section and a controlled section. The radio wave sensor is configured to output a sensing signal concerning a water flow. The control section is configured to determine a state of the water flow based on phase information of the sensing signal and to output a control signal based on a determination result. The controlled section is configured to be controlled based on the control signal.

6 Claims, 16 Drawing Sheets

WET AREA DEVICE

CROSS-REFERENCE TO RELATED APPLICATIONS

This application is based upon and claims the benefit of priority from Japanese Patent Application No. 2016-058848, filed on Mar. 23, 2016; the entire contents of which are incorporated herein by reference.

FIELD

Embodiments of the invention relate to a wet area device.

BACKGROUND

In recent years, there has been proposed a technique for providing a wet area device with a radio wave sensor such as a Doppler sensor. The state of a water flow is determined by the Doppler sensor. The operation of the device can be controlled based on the determination result.

For instance, International Patent Publication No. WO 2003/021052 proposes a toilet stool flushing device provided with a Doppler sensor. In this device, the urine flow (water flow) of a user is sensed by analyzing the intensity or frequency of the signal of the Doppler sensor. Thus, an appropriate amount of flush water can be supplied in accordance with the amount of urine.

However, the signal of the Doppler sensor changes with the state of the target and the ambient environment of the Doppler sensor. For instance, in the case where the target is a water flow, a desired signal intensity or frequency may fail to be observed due to the change in the momentum of the water flow or the water pressure, the change in e.g. the distance from the Doppler sensor to the water flow, and the change of the ambient environment such as temperature change. In such cases, the state of the water flow may fail to be determined stably.

SUMMARY

A wet area device according to an embodiment comprises a radio wave sensor configured to output a sensing signal concerning a water flow, a control section configured to determine a state of the water flow based on phase information of the sensing signal and to output a control signal based on a determination result, and a controlled section configured to be controlled based on the control signal.

DETAILED DESCRIPTION

Figure 1:
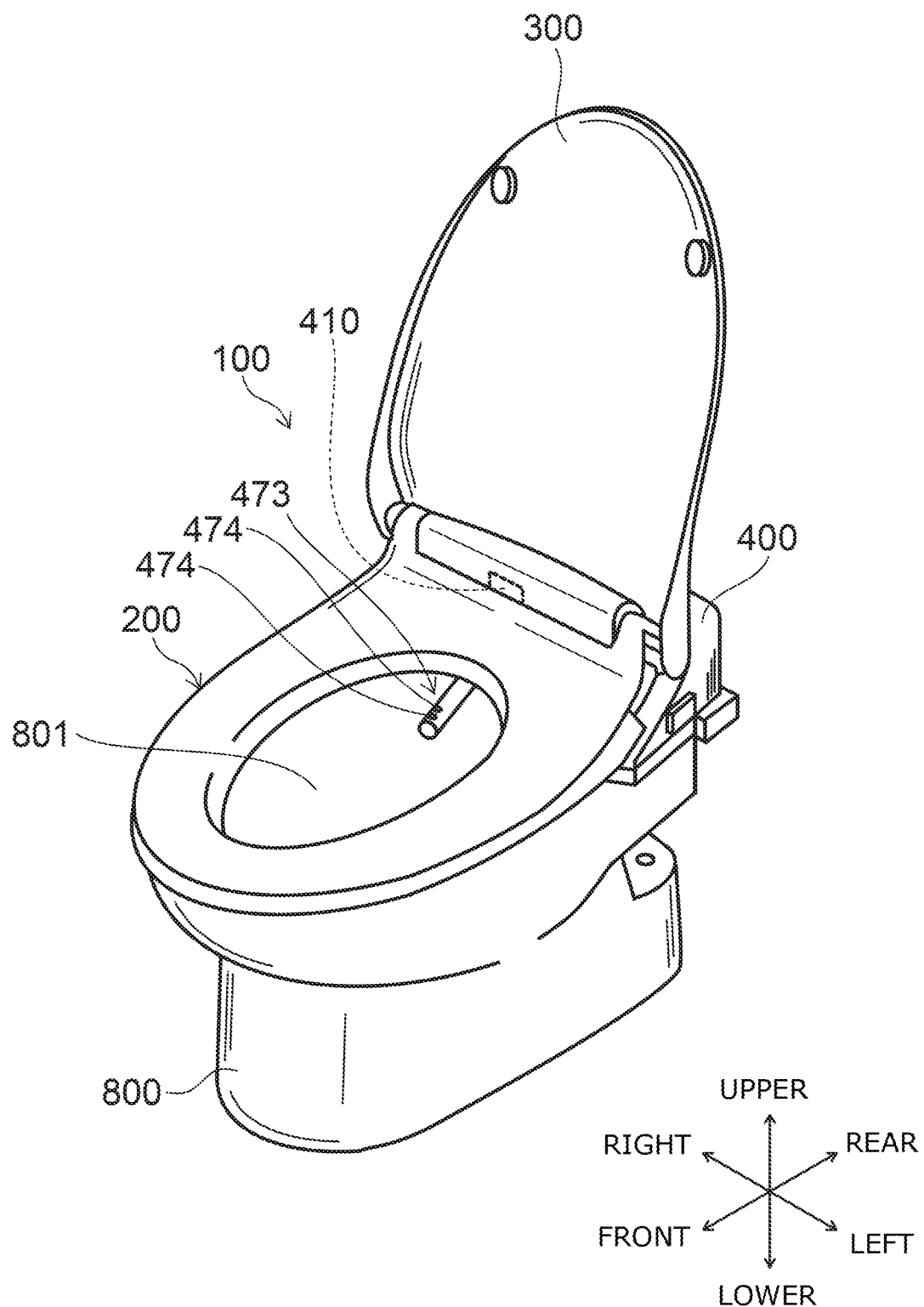
FIG. 1 is a perspective view showing a toilet device according to the present embodiment.

A first aspect of the invention is a wet area device comprising a radio wave sensor configured to output a sensing signal concerning a water flow, a control section configured to determine a state of the water flow based on phase information of the sensing signal and to output a control signal based on a determination result, and a controlled section configured to be controlled based on the control signal.

In this wet area device, the state of the water flow is determined based on the phase information of the sensing signal of the radio wave sensor. Thus, compared with the case of determining the state of the water flow based on the signal intensity or frequency of the sensing signal, the state of the water flow can be determined more stably and accurately even if the environment of the radio sensor is changed.

A second aspect of the invention is a wet area device according to the first aspect of the invention, wherein the water flow is a flow of water jetted from a human body or the controlled section, the radio wave sensor emits a radio wave in a direction along a direction of the water flow, and the control section determines whether the direction of the water flow is a direction toward the radio wave sensor or a direction away from the radio wave sensor, and controls operation of the controlled section based on the determined direction of the water flow.

In this wet area device, the radio wave sensor emits a radio wave along the water flow from the controlled section or a human body. Thus, it can be accurately determined whether the direction of the water flow is a direction approaching or leaving the radio wave sensor.

A third aspect of the invention is a wet area device according to the first or second aspect of the invention, wherein the radio wave sensor receives a reflection wave of the emitted radio wave reflected by the water flow and outputs the sensing signal, the sensing signal includes a first signal and a second signal different in phase from the first signal, and the phase information is based on a difference between the phase of the first signal and the phase of the second signal.

In this wet area device, compared with the case of determining the state of the water flow based on the signal intensity or frequency of the sensing signal, the state of the water flow can be determined more stably and accurately even if the environment of the radio sensor is changed.

A fourth aspect of the invention is a wet area device according to one of the first to third aspects of the invention, wherein the controlled section includes a nozzle having a jetting port, and the water flow is a flow of water jetted from the jetting port.

In this wet area device, the state of the water flow can be stably determined based on the phase information even if e.g. the pressure or momentum of the water flow from the nozzle is changed.

A fifth aspect of the invention is a wet area device according to the fourth aspect of the invention, wherein upon determining that the water flow is jetted from the jetting port, the control section controls the controlled section so as to stop jetting from the jetting port.

The user may fall from the toilet seat during jetting of the nozzle. Alternatively, jetting of the nozzle may erroneously start when the user is in the standing state. In such cases, this wet area device can prevent drenching the floor and splashing the user due to continued jetting from the nozzle.

A sixth aspect of the invention is a wet area device according to one of the first to third aspects of the invention, further comprising a toilet stool, wherein the water flow is a flow of urine of a user jetted to the toilet stool.

In this wet area device, the water flow (urine flow) can be stably detected based on the phase information even if e.g. the amount or momentum of urine is changed.

A seventh aspect of the invention is a wet area device according to the sixth aspect of the invention, wherein the control section determines the state of the flow of urine jetted from the user and controls the controlled section based on the determination result of the flow of urine.

In this wet area device, it can be determined whether the user is urinating or has finished urination by determining the state of the urine flow from the user. For instance, the controlled section is a toilet stool flushing unit. In this case, the control section can disable flushing performed by the toilet stool flushing unit when the user approaching the toilet stool does not perform urination. This can save water.

Embodiments of the invention will now be described with reference to the drawings. In the drawings, similar components are labeled with like reference numerals, and the detailed description thereof is omitted appropriately.

The wet area device according to the present embodiment includes a radio wave sensor such as a Doppler sensor operable for emitting high-frequency radio waves. This wet area device controls the operation of an apparatus (controlled section) based on the output of the radio wave sensor.

In the following, a toilet device including a sit-down toilet stool (hereinafter also simply referred to as "toilet stool") is first described as an example. That is, the "wet area device" is e.g. a sanitary flushing device installed on a sit-down toilet stool, or a toilet device including a toilet stool and a sanitary flushing device. However, as described later, the present embodiment is also applicable to a toilet device including a urinal, and an automatic water faucet device.

FIG. 1 is a perspective view showing a toilet device according to the present embodiment.

Figure 2:
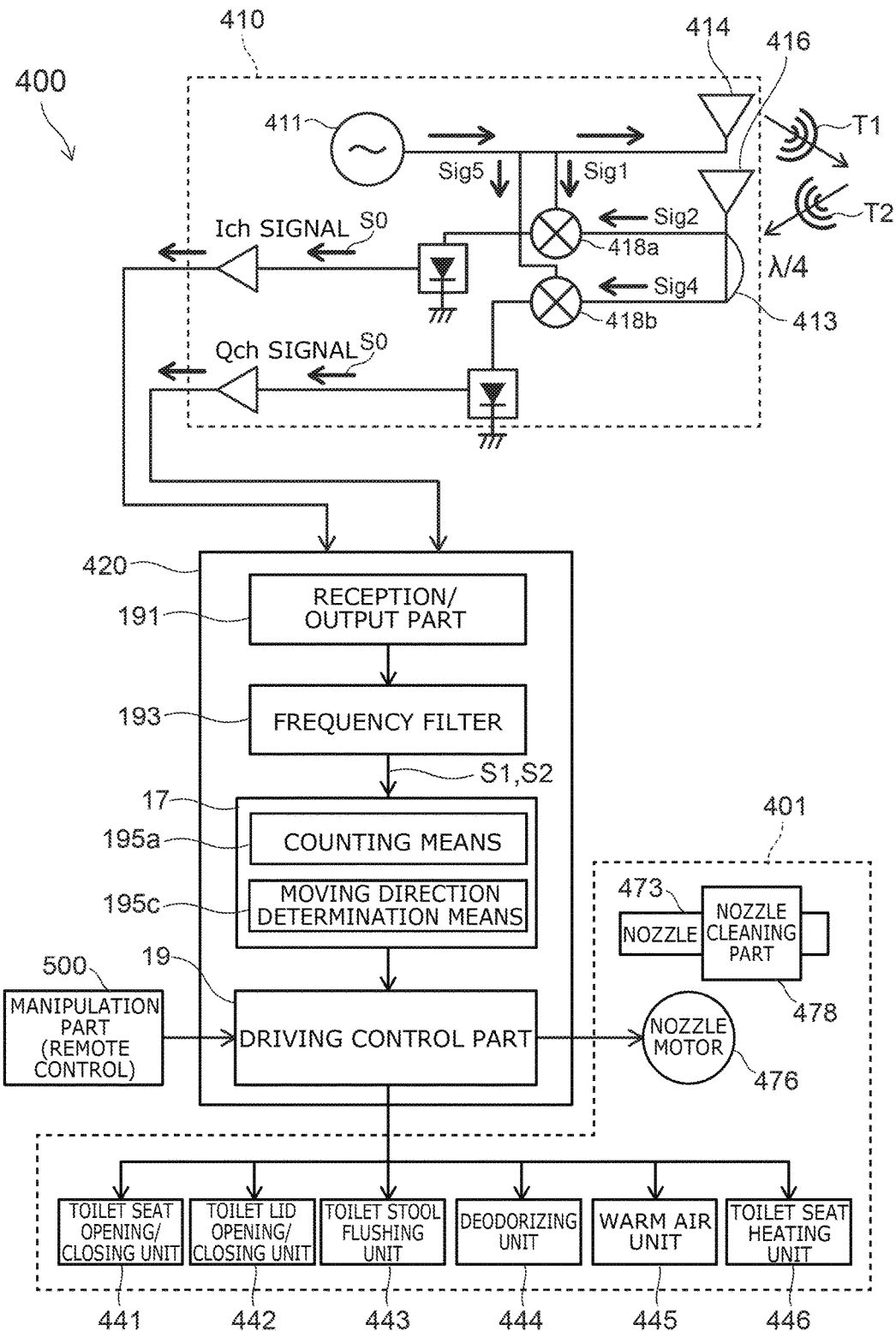
FIG. 2 is a block diagram showing the main configuration of the toilet device according to the present embodiment.

FIG. 2 is a block diagram showing the main configuration of the toilet device according to the present embodiment.

The toilet device shown in FIG. 1 includes a sit-down toilet stool 800 and a sanitary flushing device 100 provided thereon. The sanitary flushing device 100 includes a casing 400, a toilet seat 200, and a toilet lid 300. The toilet seat 200 and the toilet lid 300 are each pivotally supported on the casing 400 in an openable/closable manner.

In this description, there are cases of using the term "direction". This "direction" refers to the direction as viewed from a user seated on the toilet seat 200. For instance, the front of the user seated on the toilet seat 200 is referred to as "front", and the rear of the user seated on the toilet seat 200 is referred to as "rear".

As shown in FIG. 2, a radio wave sensor (Doppler sensor 410), a control section 420, and a controlled section 401 are provided inside the casing 400.

The Doppler sensor 410 emits (transmits) high-frequency radio waves such as microwaves or millimeter waves, and receives reflection waves from a sensing target (to-be-sensed body) of the emitted radio waves. The reflection waves include information on the state of the sensing target. The Doppler sensor 410 outputs a sensing signal based on the emitted radio waves and the reflection waves. In the present embodiment, the sensing target is e.g. water (water flow). That is, the Doppler sensor 410 outputs a sensing signal concerning the water flow. In this description, the scope of the "water flow" includes not only a flow of water but also a flow of heated warm water and a flow of liquid such as urine of a user (urine flow).

The control section 420 is made of circuits such as a microcomputer. The control section 420 outputs a control signal to the controlled section 401 based on the sensing signal outputted from the Doppler sensor 410. Thus, the operation of the controlled section 401 is controlled.

The controlled section 401 includes a nozzle 473, a nozzle motor 476, a nozzle cleaning part 478, a toilet seat opening/closing unit 441, a toilet lid opening/closing unit 442, a toilet stool flushing unit 443, a deodorizing unit 444, a warm air unit 445, and a toilet seat heating unit 446.

The nozzle 473 can be advanced or retracted in the bowl 801 of the toilet stool 800 under the driving force from the nozzle motor 476. That is, the nozzle motor 476 can advance or retract the nozzle 473 based on the signal from the control section 420. The nozzle 473 can squirt cold (or warm) water from the jetting port 474 toward e.g. the front. Thus, the nozzle 473 can clean the user's private parts. The nozzle cleaning part 478 squirts sterilizing water or water from a jetting part, not shown, provided therein. Thus, the nozzle cleaning part 478 can sterilize or clean the outer peripheral surface (body) of the nozzle 473.

The toilet seat opening/closing unit 441 can open/close the toilet seat 200 based on a control signal from the control section 420. The toilet lid opening/closing unit 442 can open/close the toilet lid 300 based on a control signal from the control section 420. When the user manipulates a manipulation section 500 such as a remote control, the toilet stool flushing unit 443 can flush the bowl 801 of the toilet stool 800 based on a control signal from the control section 420. The deodorizing unit 444 reduces odorous components through e.g. a filter or catalyst. The warm air unit 445 blows warm air toward e.g. the "bottoms" of the user seated on the toilet seat 200 for drying. The toilet seat heating unit 446 blows warm air into the toilet room to heat the toilet room.

As shown in FIG. 1, the Doppler sensor 410 is provided in e.g. the rear of the toilet seat 200. Specifically, the Doppler sensor 410 is provided in the rear of the toilet seat 200 and in a front part inside the casing 400.

For instance, the Doppler sensor 410 senses water (water flow) jetted (discharged) from the nozzle 473 or urine (urine flow) of the user. In the controlled section 401, for instance, the nozzle 473, the nozzle motor 476, and the toilet stool flushing unit 443 are controlled based on the sensing signal concerning the water flow of the Doppler sensor 410. For instance, wasteful jetting from the nozzle 473 is stopped by sensing the water jetted from the nozzle 473. Alternatively, the toilet stool is flushed by sensing the user's urine.

As shown in FIG. 2, the Doppler sensor 410 includes an oscillator 411, a transmitter part 414 (antenna), a receiver part 416 (antenna), mixer parts 418a, 418b, and a phase shift means 413. The Doppler sensor 410 is a sensor operable for outputting a sensing signal SO including an Ich signal and a Qch signal. In this example, the antenna on the transmitting side and the antenna on the receiving side are provided separately. However, the antenna on the transmitting side and the antenna on the receiving side may be provided as a common component.

Radio waves in the frequency band of 10 kHz to 100 GHz such as high-frequency radio waves, microwaves, and millimeter waves are emitted from the transmitter part 414 connected to the oscillator 411. For instance, a transmission wave T1 having a frequency of 10.50-10.55 GHz or 24.05-24.25 GHz is emitted toward the front of the toilet device. The receiver part 416 receives a reflection wave T2 from a sensing target such as a water flow or a human body.

Part of the transmission wave (signal Sig1) and part of the reception wave (signal Sig2) are inputted to the mixer part 418a and combined with each other. Thus, a signal reflecting e.g. the Doppler effect (Ich signal) is outputted.

On the other hand, part of the reception wave is inputted to the phase shift means 413. The part of the reception wave is shifted in phase by the phase shift means 413 into a signal Sig4. An example of the phase shift means 413 is to change the length or layout of the interconnect for conveying the information of the reception wave to the mixer part 418b. In this example, the phase shift means 413 shifts the phase by 90° ($\pi/2$, quarter wavelength). Part of the transmission wave (signal Sig5) and the signal Sig4 are inputted to the mixer part 418b and combined with each other. Thus, a signal reflecting e.g. the Doppler effect (Qch signal) is outputted.

The sensing signal SO (each of the Ich signal and the Qch signal) has a waveform in which a high-frequency signal is superimposed on a low-frequency baseline.

The sensing signal SO includes information on the Doppler effect. More specifically, when the transmission wave is reflected by a sensing target in motion, the wavelength of the reflection wave is shifted by the Doppler effect. Movement of the sensing target relative to the Doppler sensor 410 results in a sensing signal including a frequency component $\Delta F$ proportional to the velocity of the sensing target. Thus, the velocity of the sensing target can be determined by measuring the Doppler frequency $\Delta F$.

Furthermore, the sensing signal SO also includes information on the standing wave (standing wave signal). More specifically, between the Doppler sensor 410 and the sensing target, a standing wave occurs due to mutual interference between the transmission wave and the reflection wave reflected by the sensing target.

The Ich signal and the Qch signal as described above are inputted to the control section 420 as shown in FIG. 2.

The control section 420 includes a reception/output part 191 (A/D conversion means), a frequency filter 193, a determination part 17, and a driving control part 19. The block diagram shown in FIG. 2 is illustrative only, and the embodiment is not limited thereto. For instance, part of the functional blocks included in the control section 420 may be divided or integrated as appropriate. For instance, the reception/output part 191, the frequency filter 193, the determination part 17, and the driving control part 19 may be provided separately.

The Ich signal and the Qch signal are inputted to the reception/output part 191 and converted to a digital signal. The digitized signal is inputted to the frequency filter 193. The frequency filter 193 removes unwanted frequency components. Thus, a first signal S1 concerning the standing wave is extracted from the Ich signal. That is, the control section 420 obtains a first signal S1 included in the sensing signal. For instance, the first signal S1 is a signal indicating the signal intensity of the standing wave and including the DC component of the Ich signal.

Furthermore, a second signal S2 concerning the standing wave is extracted from the Qch signal. That is, the control section 420 obtains a second signal S2 included in the sensing signal. For instance, the second signal S2 is a signal indicating the signal intensity of the standing wave and including the DC component of the Qch signal.

The frequency filter 193 may be provided between the Doppler sensor 410 and the reception/output part 191. In this case, the processing of conversion to a digital signal is performed on the signal processed by the frequency filter 193.

The control section 420 determines the state of the sensing target based on the obtained sensing signal (first signal S1 and second signal S2). For instance, the sensing target is a water flow. In this case, the determination part 17 of the control section 420 determines the presence or absence of a water flow from the nozzle 473 and the flowing direction of the water. Then, the control section 420 outputs a control signal to the controlled section 401 based on the determination result.

The Doppler sensor 410 may be configured to be able to sense not only a water flow but also a user. In this case, the determination part 17 determines the presence or absence and the motion of the user based on the sensing signal of the Doppler sensor 410. Thus, for instance, upon sensing room entry of a user, the toilet lid 300 is automatically opened. Upon sensing room exit of a user, the toilet lid 300 is automatically closed. Furthermore, for instance, when the Doppler sensor 410 senses seating of a user, the user may manipulate the manipulation section 500. Then, the nozzle 473 is advanced into the bowl 801, and cold or warm water is squirted from the jetting port 474. Furthermore, for instance, the toilet stool flushing unit 443 and the deodorizing unit 444 are controlled upon sensing unseating of a user.

Figure 3:
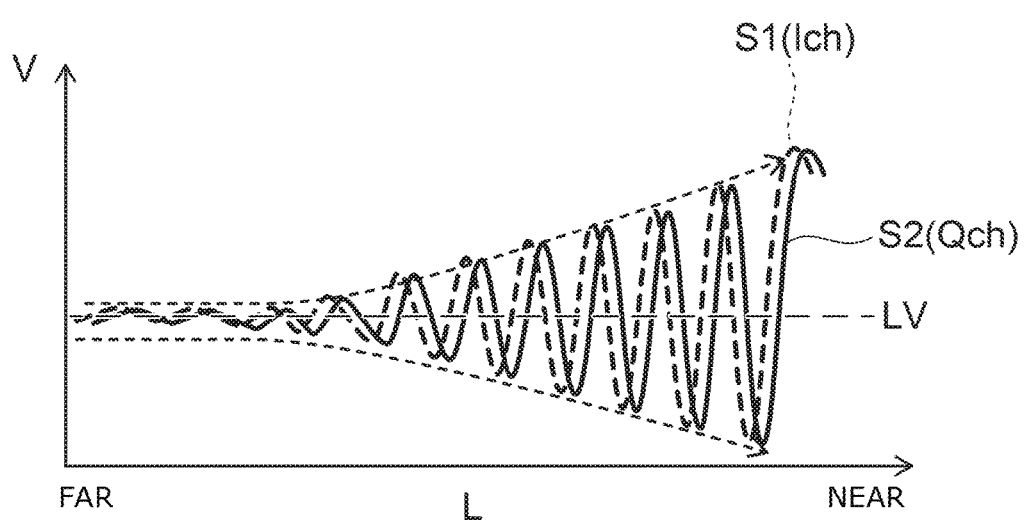
FIG. 3 is a conceptual diagram illustrating the sensing signal according to the embodiment.

FIG. 3 is a conceptual diagram illustrating the sensing signal (first signal S1 and second signal S2) according to the embodiment.

The horizontal axis of FIG. 3 represents the distance L between the Doppler sensor 410 and the sensing target. In FIG. 3, the distance L is shorter toward the right side and longer toward the left side. The vertical axis of FIG. 3 represents the voltage value of the first signal S1 and the voltage value of the second signal S2. FIG. 3 shows the variation of the voltage value of the first signal S1 with respect to the distance L, and the variation of the voltage value of the second signal S2 with respect to the distance L.

The first signal S1 and the second signal S2 each oscillate about a reference value LV as the distance L changes. Depending on the environment around the Doppler sensor 410, the oscillation center of the first signal S1 and the oscillation center of the second signal S2 may be misaligned.

However, in this example, the oscillation centers of the respective signals are aligned with the reference value LV in the control section 420. The reference value LV can be established from e.g. the running average of the respective signals.

The intensity of the reflection wave received by the Doppler sensor 410 is lower as the distance L is longer. Thus, the amplitude of the first signal S1 about the reference value LV is smaller as the distance L is longer. Likewise, the amplitude of the second signal S2 about the reference value LV is smaller as the distance L is longer.

In the waveform shown in FIG. 3, the first signal S1 and the second signal S2 are out of phase with each other. In this embodiment, the control section 420 determines the state of the sensing target based on such phase information of the sensing signal. That is, the state of the sensing target is determined based on the difference between the phase of the first signal S1 and the phase of the second signal S2. Next, this determination is described.

Figure 4A:
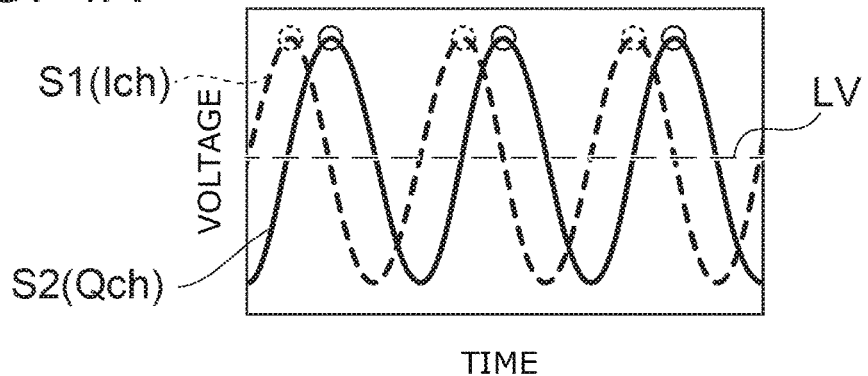
FIGS. 4A to 4C are graphs and a flow chart describing the operation of the control section according to the embodiment.
Figure 4B:
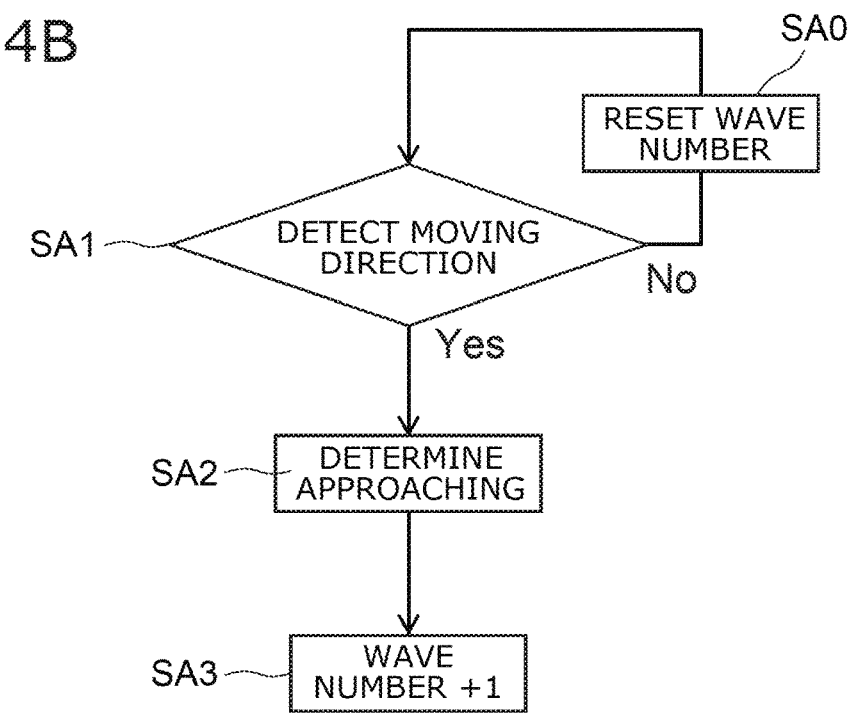
Figure 4C:
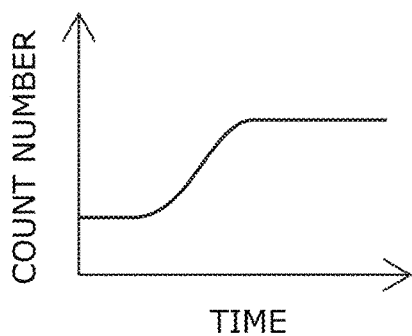

FIGS. 4A to 4C are graphs and a flow chart describing the operation of the control section according to the embodiment.

FIGS. 4A to 4C show the case where the sensing target is approaching the Doppler sensor 410, i.e., the distance L becomes shorter. That is, in the case where the sensing target is a water flow, the water is flowing toward the Doppler sensor 410.

When the sensing target is moving, the distance L described with reference to FIG. 3 changes. Thus, as shown in FIG. 4A, the first signal S1 and the second signal S2 oscillate over time.

In FIG. 4A, the phase of the first signal S1 is different from the phase of the second signal S2. This phase difference depends on whether the sensing target is approaching or leaving the Doppler sensor 410. When the sensing target is approaching the Doppler sensor 410, the second signal S2 lags in phase behind the first signal S1 by e.g. 90°. That is, the second signal S2 is detected lagging behind the first signal S1. The moving direction determination means 195c uses this point to detect approaching.

FIG. 4B is a flow chart illustrating the operation of the moving direction determination means 195c and the counting means 195a.

First, in step SA1, the moving direction determination means 195c detects the moving direction of the sensing target. In step SA2, the moving direction determination means 195c determines that the sensing target is approaching the Doppler sensor 410. In step SA3, the counting means 195a adds 1 to the count number. Subsequently, the processing from step SA1 is performed again.

When the sensing target keeps approaching the Doppler sensor 410, steps SA1-SA3 are performed repetitively. Thus, as shown in FIG. 4C, the count number increases over time. This number of increase in the count number corresponds to the number of waves of the first signal S1 observed by the approaching of the sensing target. The wavelength of the radio wave emitted by the Doppler sensor 410 is denoted by $\lambda$. Then, observation of one wave corresponds to movement of the sensing target by a distance of $\lambda/2$. For instance, the frequency of the radio wave emitted by the Doppler sensor 410 is approximately 24 GHz. Then, $\lambda/2$ is equal to approximately 6.2 mm. Thus, the movement distance of the sensing target can be calculated from the number of increase in the count number.

In step SA1, if the moving direction determination means 195c does not detect approaching, i.e., if the second signal S2 lagging behind the first signal S1 is not detected, then step SA2 and step SA3 are not performed, but the processing from step SA1 is performed again. At this time, the count number is reset in e.g. step SA0.

Figure 5A:
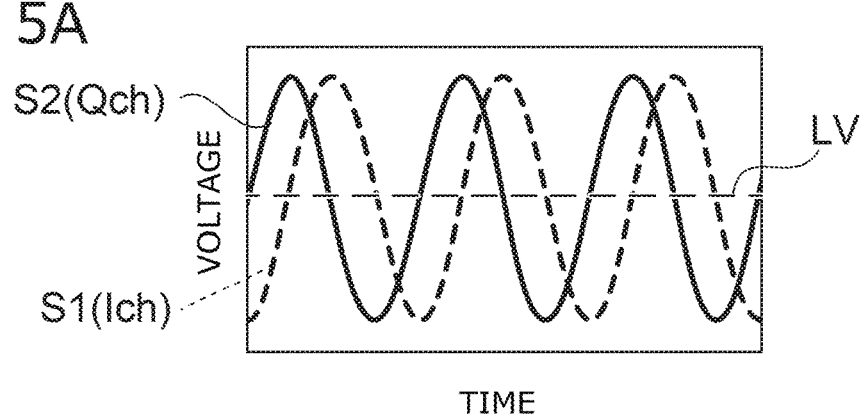
FIGS. 5A to 5C are graphs and a flow chart describing the operation of the control section according to the embodiment.
Figure 5B:
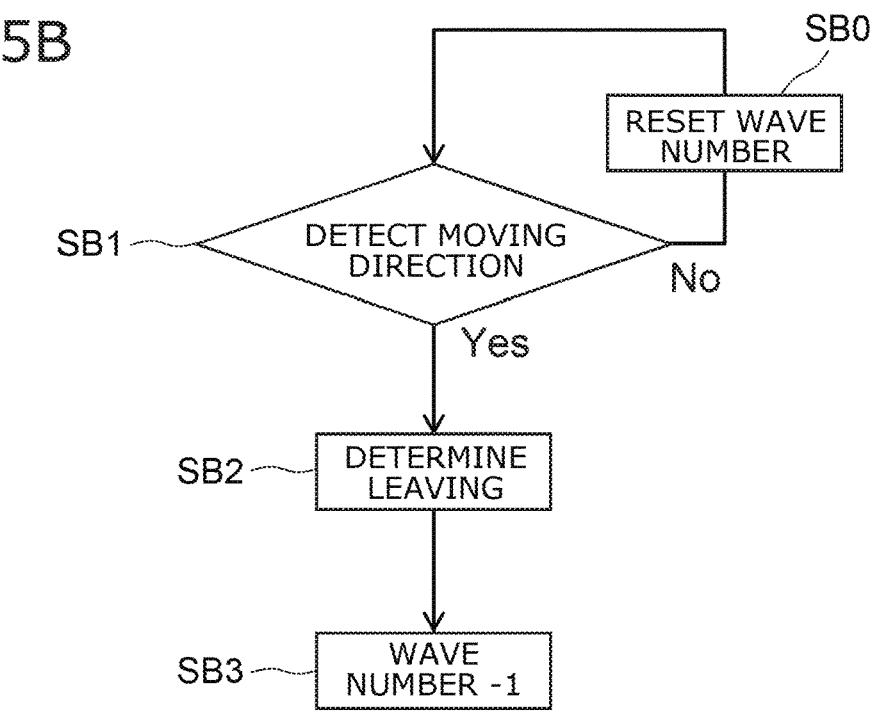
Figure 5C:
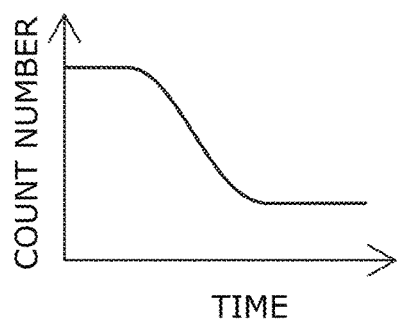

FIGS. 5A to 5C are graphs and a flow chart describing the operation of the control section according to the embodiment.

FIGS. 5A to 5C show the case where the sensing target is leaving the Doppler sensor 410, i.e., the distance L becomes longer. That is, in the case where the sensing target is a water flow, the water is flowing away from the Doppler sensor 410.

As shown in FIG. 5A, the first signal S1 and the second signal S2 oscillate over time. When the sensing target is leaving the Doppler sensor 410, the first signal S1 lags in phase behind the second signal S2 by e.g. 90°. That is, the first signal S1 is detected lagging behind the second signal S2. The moving direction determination means 195c uses this point to detect leaving.

FIG. 5B is a flow chart illustrating the operation of the moving direction determination means 195c and the counting means 195a.

First, in step SB1, the moving direction determination means 195c detects the moving direction of the sensing target. In step SB2, the moving direction determination means 195c determines that the sensing target is leaving the Doppler sensor 410. In step SB3, the counting means 195a subtracts 1 from the count number. Subsequently, the processing from step SB1 is performed again.

When the sensing target keeps leaving the Doppler sensor 410, steps SB1-SB3 are performed repetitively. Thus, as shown in FIG. 5C, the count number decreases over time. This count number corresponds to the number of waves of the first signal S1 observed by the leaving of the sensing target. The movement distance of the sensing target can be calculated from the number of decrease in the count number.

In step SB1, if the moving direction determination means 195c does not detect leaving, i.e., if the first signal S1 lagging behind the second signal S2 is not detected, then step SB2 and step SB3 are not performed, but the processing from step SB1 is performed again. At this time, the count number is reset in e.g. step SB0.

The determination result in the determination part 17 is inputted to the driving control part 19. The driving control part 19 outputs a control signal to the controlled section 401 based on the inputted signal concerning the determination result and the signal from the manipulation section 500. Thus, the operation of the controlled section 401 is controlled.

As described above, approaching or leaving of the sensing target can be determined from the phase information of the sensing signal of the Doppler sensor 410. That is, the flowing direction of the water can be determined. Furthermore, the state of the water flow can be determined by the determination of approaching or leaving. In this description, the "state of the water flow" includes the presence or absence of the water flow.

As described before, the signal intensity of the first signal S1 and the second signal S2 is higher as the distance L between the Doppler sensor 410 and the sensing target is nearer. This may be used to determine the state of the sensing target from the signal intensity. For instance, a prescribed threshold is defined for the signal intensity. The state of the sensing target can be determined by comparison between the threshold and the signal intensity. Alternatively, it is also possible to consider another method for determining the state of the sensing target by extracting a Doppler signal including a component of the Doppler frequency $\Delta F$ from the sensing signal SO of the Doppler sensor 410. For instance, the state of the sensing target can be determined by sensing the motion of the sensing target from the Doppler signal in a prescribed frequency band.

However, the determination accuracy of the Doppler sensor 410 may be lowered when using the method for determining the state of the sensing target based on the signal intensity or frequency. Specifically, the sensing signal of the Doppler sensor 410 is affected by the state of the target and the ambient environment of the Doppler sensor 410. For instance, the sensing signal of the Doppler sensor 410 may change due to the change in the momentum of the water flow or the water pressure, and the change in the distance from the Doppler sensor 410 to the water flow. Thus, a desired signal intensity or frequency may fail to be obtained. Furthermore, the sensing signal of the Doppler sensor 410 may also change with the change in the ambient environment of the Doppler sensor 410 (such as change in the ambient temperature). Thus, a desired signal intensity or frequency may fail to be obtained.

As described above, when the signal intensity or frequency of the sensing signal of the Doppler sensor 410 is changed, the signal intensity may not exceed the threshold, or the Doppler signal in the prescribed frequency band may not be obtained. Then, the state of the sensing target may fail to be determined. In this case, it is also possible to consider e.g. a method for causing the control section 420 to learn a threshold in response to the ambient environment. However, this complicates the processing of the control section 420.

In contrast, the control section 420 according to the embodiment determines the state of the water flow based on the phase information of the sensing signal. Specifically, as described with reference to FIGS. 4A and 5A, the state of the water flow can be determined based on the phase shift (order of waves) of the first signal S1 and the second signal S2. Such phase relation is relatively less prone to change even when the signal intensity or frequency of the sensing signal of the Doppler sensor 410 is changed. Thus, according to the embodiment, compared with the case of determining the state of the water flow based on the signal intensity or frequency of the sensing signal, the state of the water flow can be determined more stably and accurately even if the state of the water flow and the ambient environment of the Doppler sensor 410 are changed.

In the following, a specific example of the wet area device according to the embodiment is described.

Figure 6A:
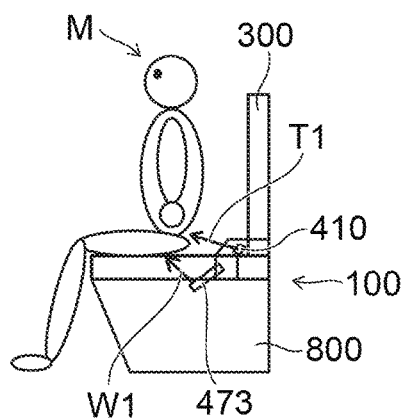
FIGS. 6A to 6C are plan views illustrating the operation of the wet area device according to the embodiment.
Figure 6B:
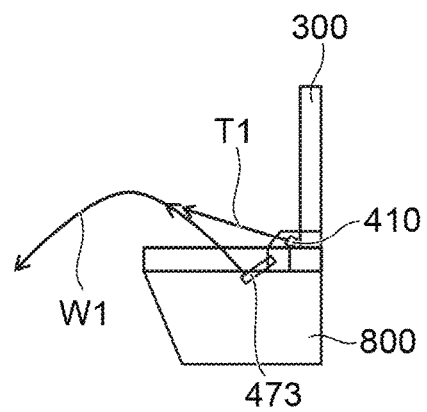
Figure 6C:
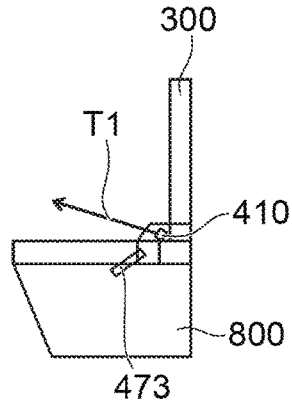

FIGS. 6A to 6C are plan views illustrating the operation of the wet area device according to the embodiment.

Figure 7:
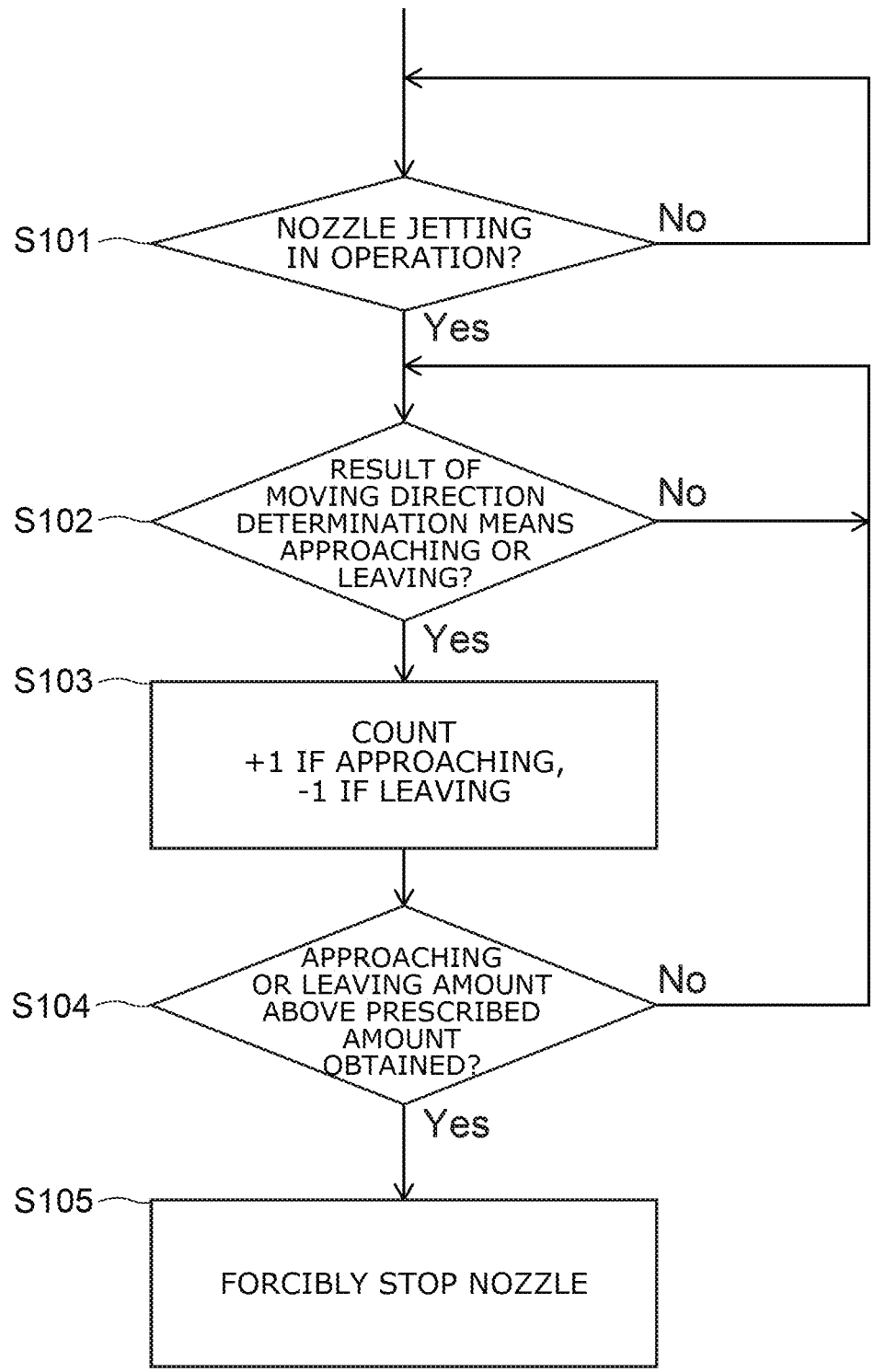
FIG. 7 is a flow chart illustrating the operation of the wet area device according to the embodiment.

FIG. 7 is a flow chart illustrating the operation of the wet area device according to the embodiment.

Figure 8:
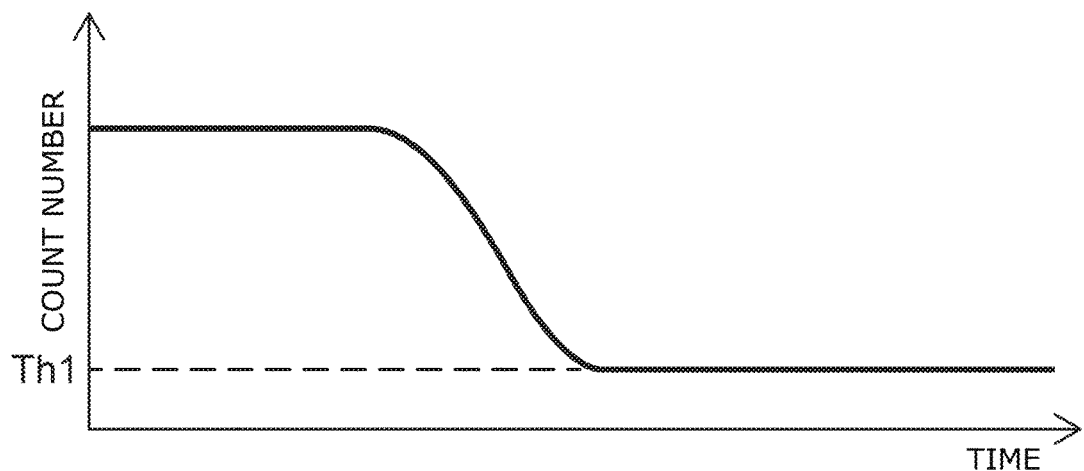
FIG. 8 is a graph illustrating the operation of the wet area device according to the embodiment.

FIG. 8 is a graph illustrating the operation of the wet area device according to the embodiment.

In the specific example with reference to FIGS. 6A to 8, the wet area device is a sanitary flushing device 100. The operation of the nozzle 473 is controlled based on the sensing signal of the Doppler sensor 410.

As shown in FIGS. 6A to 6C, the Doppler sensor 410 emits a transmission wave T1. The transmission wave T1 spreads e.g. concentrically about the Doppler sensor 410. At this time, the radio wave can be provided with directivity so that the intensity of the radio wave emitted to one direction (e.g., front) from the Doppler sensor 410 is higher than the intensity of the radio wave emitted to the other directions. As shown in FIG. 6B, a water flow W1 from the nozzle 473 may exist when the user M is not seated. The Doppler sensor 410 is placed so that (at least part of) the transmission wave T1 is reflected by the water flow W1 in this case. The Doppler sensor 410 emits a radio wave in the direction along the water flow W1. The traveling direction of (at least part of) the transmission wave T1 is not orthogonal to the flowing direction of the water jetted from the nozzle 473. The placement of the Doppler sensor 410 and the traveling direction of the transmission wave T1 as described above enable accurate determination of whether the direction of the water flow W1 is an approaching direction or a leaving direction.

For instance, as shown in FIG. 6A, the user M is seated on the toilet seat 200. At this time, the Doppler sensor 410 receives a reflection wave from the user M. Thus, seating of the user M is determined by the control section 420. The determination of seating of the user M may be based on the output of another sensor (such as a tactile switch and an infrared sensor) rather than the Doppler sensor 410. At this time, the control section 420 causes the nozzle 473 to perform jetting in response to manipulation of the manipulation section 500 by the user M.

As shown in FIG. 7, when jetting is performed from the nozzle 473 (step S101, Yes), the Doppler sensor 410 receives a reflection wave of the transmission wave T1. Thus, in step S102, the moving direction of the target is determined using the method described with reference to FIGS. 4B and 5B. While the user M stays seated as shown in FIG. 6A, the transmission wave T1 and the water flow W1 are intercepted by the user M. Thus, the transmission wave T1 is not reflected by the water flow W1.

For instance, as shown in FIG. 6B, if unseating is not appropriately sensed after the user M is unseated, then jetting may be continued. At this time, the Doppler sensor 410 receives a reflection wave from the water flow W1. The moving direction determination means 195c determines whether the direction of the water flow is a direction approaching or leaving the Doppler sensor 410 based on the sensing signal from the Doppler sensor 410. Then, in step S103, the counting means 195a adds 1 to the count number if approaching, and subtracts 1 from the count number if leaving. In this example, the direction of the water flow W1 is a direction leaving the Doppler sensor 410. Thus, the count number is decremented by 1.

In step S104, it is determined whether or not a change in the count number (approaching amount or leaving amount) by not less than a prescribed amount is obtained. In this example, it is determined whether or not the count number is not more than a threshold Th1. When the count number is larger than the threshold Th1 (step S104, No), steps S102-S104 are repeated. The direction of the water flow W1 is a direction leaving the Doppler sensor 410. Thus, when jetting from the nozzle 473 is continued, the count number decreases over time as shown in FIG. 8.

When the count number becomes not more than the threshold Th1 (step S104, Yes), the control section 420 can determine that a water flow is jetted from the jetting port of the nozzle 473 although the user M is not seated. Thus, in step S105, the control section 420 controls the nozzle 473 so as to stop jetting.

For instance, the user M may fall from the toilet seat 200 during jetting from the nozzle 473. Alternatively, jetting of the nozzle 473 may erroneously start when the user is in the standing state. Even in such cases, unintended jetting can be stopped by determining the state of the water flow W1 based on the phase information of the sensing signal concerning the water flow W1. This can prevent drenching the floor and erroneously splashing the user.

In the state shown in FIG. 6B, the state of the water flow W1 can be determined also by signal intensity or frequency analysis of the sensing signal from the Doppler sensor 410.

However, the pressure and momentum of the water flow W1 may change with time. This may result in changing the signal intensity and the Doppler frequency ΔF. For instance, change in the momentum of the water flow W1 may result in changing the distance L from the Doppler sensor 410 and decreasing the signal intensity. Thus, it may be difficult to determine the state of the water flow W1 stably by the method based on e.g. signal intensity. In contrast, in the embodiment, the state of the water flow can be determined relatively stably based on the phase information even if the signal intensity is changed by change in e.g. the momentum of the water flow W1.

Figure 9A:
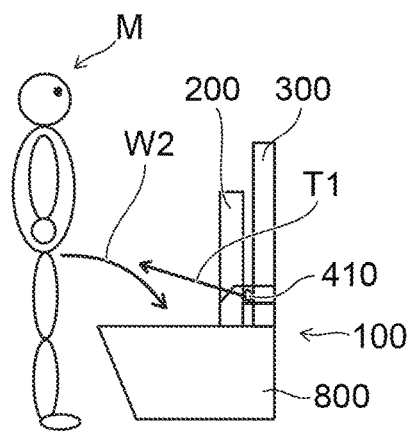
FIGS. 9A to 9C are plan views illustrating the operation of the wet area device according to the embodiment.
Figure 9B:
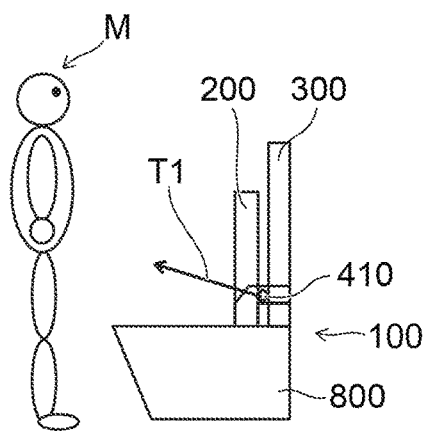
Figure 9C:
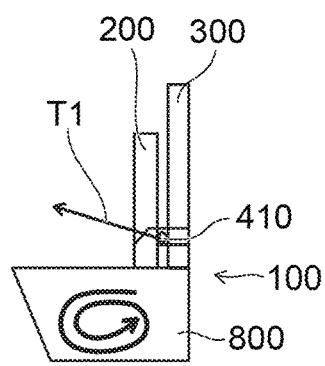

FIGS. 9A to 9C are plan views illustrating the operation of the wet area device according to the embodiment.

Figure 10:
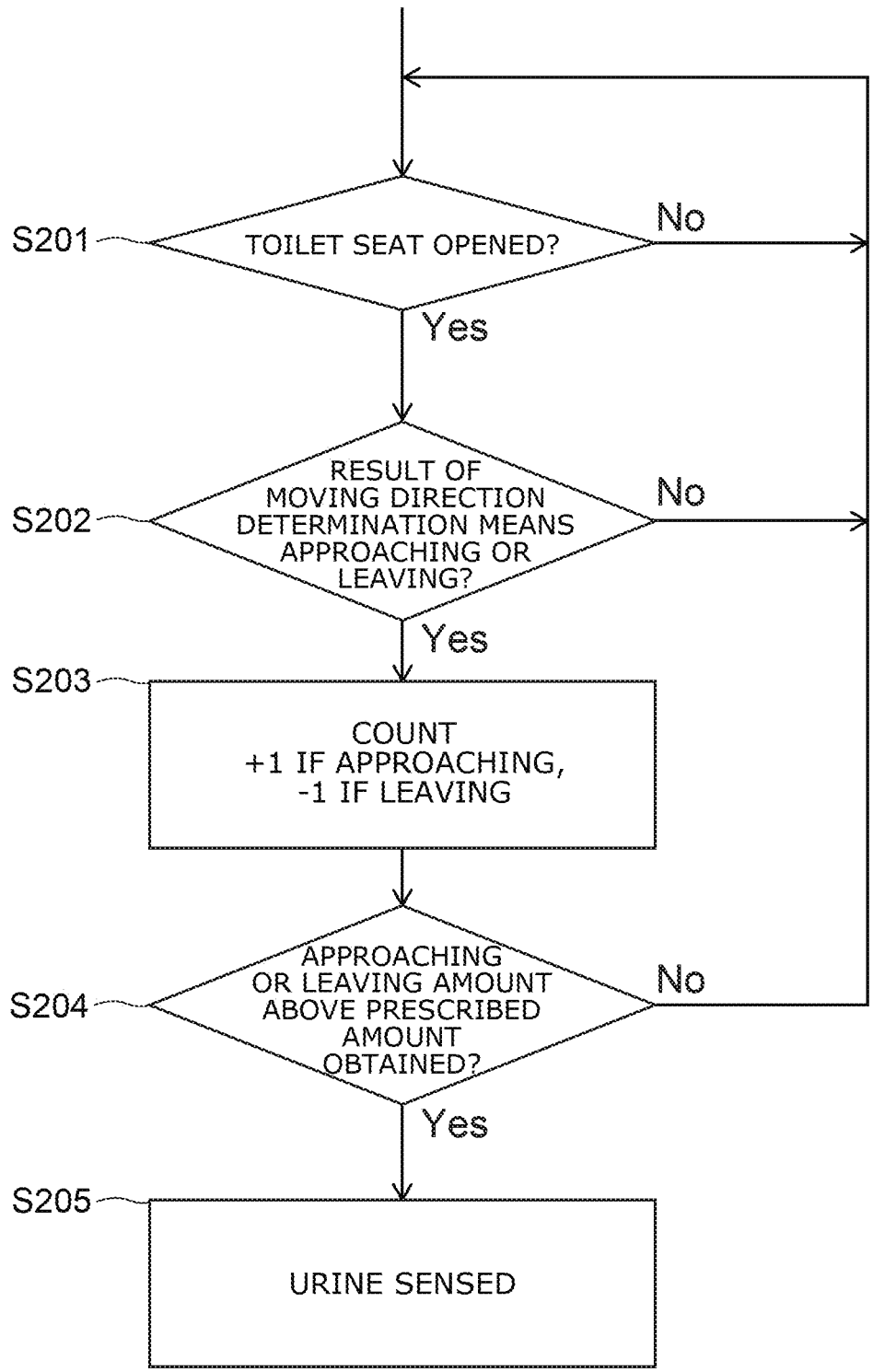
FIG. 10 is a flow chart illustrating the operation of the wet area device according to the embodiment.
Figure 11:
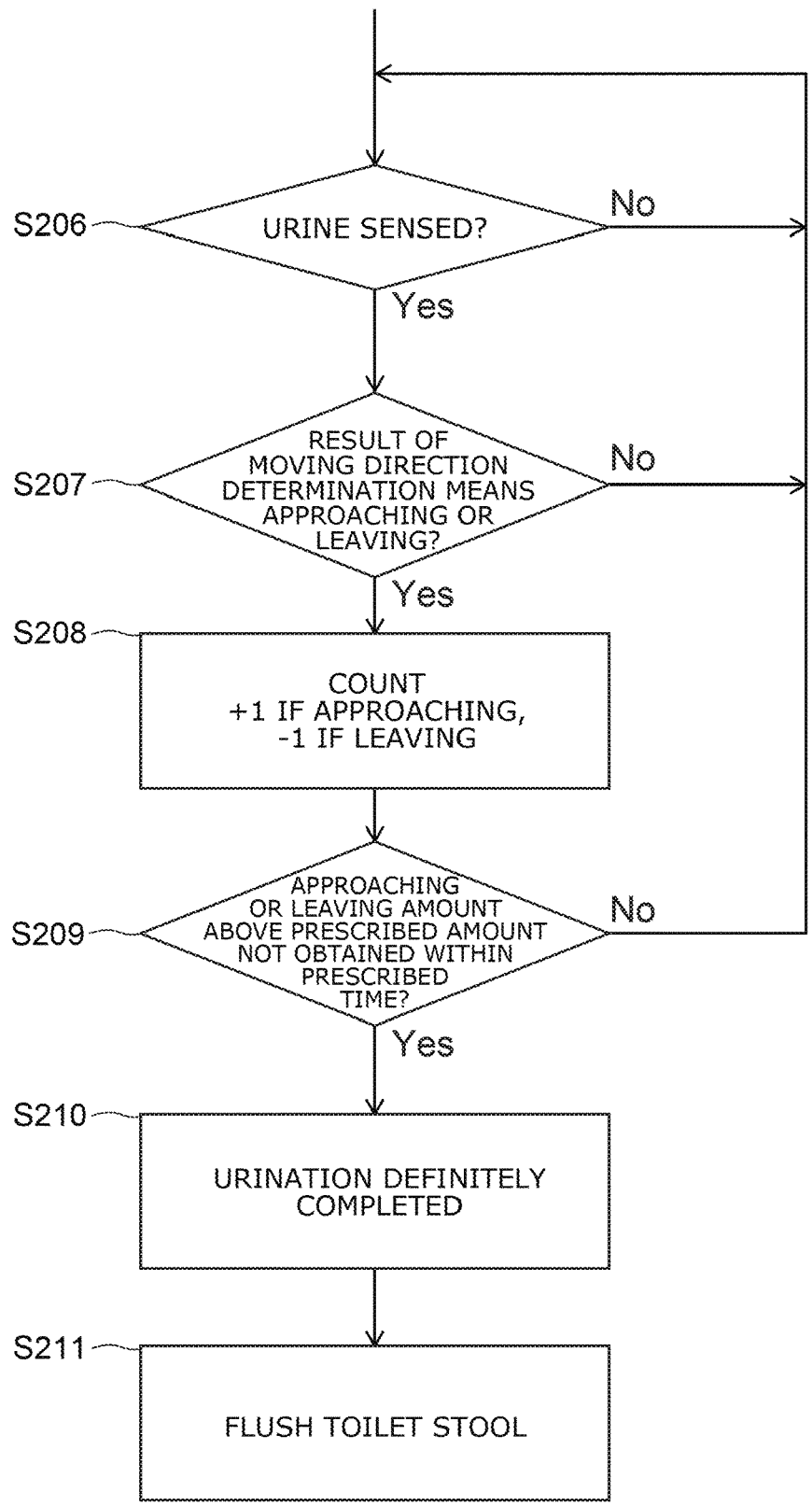
FIG. 11 is a flow chart illustrating the operation of the wet area device according to the embodiment.

FIGS. 10 and 11 are flow charts illustrating the operation of the wet area device according to the embodiment.

Figure 12:
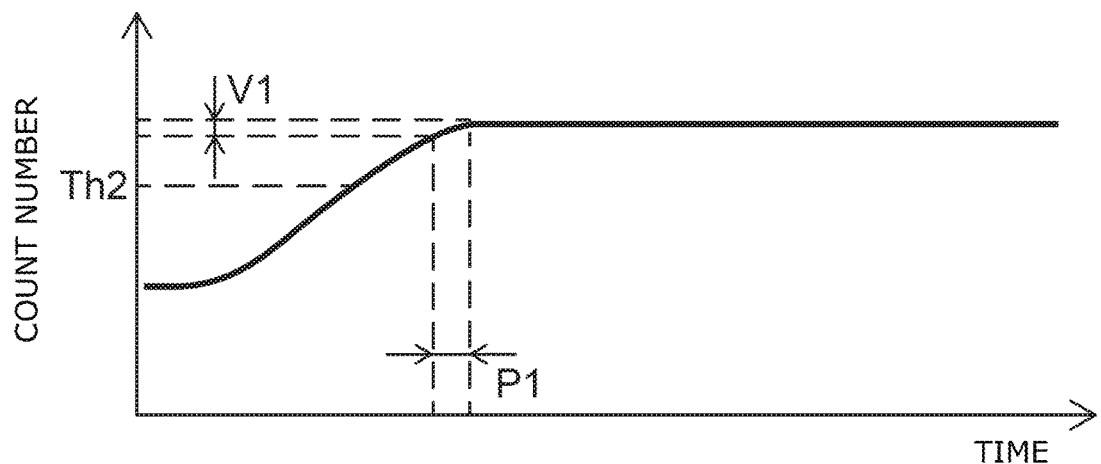
FIG. 12 is a graph illustrating the operation of the wet area device according to the embodiment.

FIG. 12 is a graph illustrating the operation of the wet area device according to the embodiment.

In the specific example with reference to FIGS. 9A to 12, the "wet area device" is a sanitary flushing device 100. As shown in FIG. 9A, the user M stands in front of the toilet stool 800 and performs urination toward the inside of the bowl 801. The Doppler sensor 410 outputs a sensing signal concerning the urine (water flow W2) of the user M. The control section 420 controls the operation of the toilet stool flushing unit 443 based on the sensing signal.

As shown in FIGS. 9A to 9C, the Doppler sensor 410 emits a transmission wave T1. As shown in FIG. 9A, a water flow W2 (urine flow) from the user M may exist. The Doppler sensor 410 is placed so that (at least part of) the transmission wave T1 is reflected by the water flow W2 in this case. The Doppler sensor 410 emits a radio wave in the direction along the water flow W2. The traveling direction of (at least part of) the transmission wave T1 is not orthogonal to the flowing direction of the urine from the user M. The placement of the Doppler sensor 410 and the traveling direction of the transmission wave T1 as described above enable accurate determination of whether the direction of the water flow W2 is an approaching direction or a leaving direction.

For instance, in the state in which the toilet seat 200 and the toilet lid 300 are opened (step S201 of FIG. 10, Yes), the user M stands in front of the toilet stool 800 and jets a water flow W2, i.e., ejects urine. Then, the Doppler sensor 410 receives a reflection wave of the transmission wave T1 reflected by the water flow W2. Thus, in step S202 shown in FIG. 10, the moving direction of the water flow W2 is determined based on the phase information. Then, in step S203, the counting means 195a adds 1 to the count number if approaching, and subtracts 1 from the count number if leaving. In this example, the direction of the water flow W2 is a direction approaching the Doppler sensor 410. Thus, the count number is incremented by 1.

In step S204, it is determined whether or not a change in the count number (approaching amount or leaving amount) by not less than a prescribed amount is obtained. In this example, it is determined whether or not the count number is not less than a threshold Th2. When the count number is smaller than the threshold Th2 (step S204, No), steps S201-S204 are repeated. The direction of the water flow W2 is a direction approaching the Doppler sensor 410. Thus, when ejection of urine of the user M is continued, the count number increases over time as shown in FIG. 12

When the count number becomes not less than the threshold Th2 (step S204, Yes), it can be determined that the user M is ejecting urine (step S205).

As shown in FIG. 11, urination of the user M continues also after it is determined that the user M is performing urination (step S206, Yes). At this time, the Doppler sensor 410 further receives a reflection wave of the transmission wave T1 reflected by the water flow W2. Then, in step S207, the moving direction of the water flow W2 is determined based on the phase information. In step S208, the counting means 195a adds 1 to the count number if approaching, and subtracts 1 from the count number if leaving. In this example, the direction of the water flow W2 is a direction approaching the Doppler sensor 410. Thus, the count number is incremented by 1.

In step S209, it is determined whether or not a change in the count number (approaching amount or leaving amount) by not less than a prescribed amount is not obtained within a prescribed time. In this example, it is determined whether or not the increment per prescribed time P1 in the count number is not more than a threshold V1. When the increment per prescribed time P1 in the count number is larger than the threshold V1 (step S209, No), steps S206-S209 are repeated. Thus, as shown in FIG. 12, the count number further increases over time.

When the increment per prescribed time P1 in the count number becomes not more than the threshold V1 (step S209, Yes), the control section 420 can determine that urination of the user M is completed as shown in FIG. 9B (step S210). The control section 420 controls the operation of the toilet stool flushing unit 443 based on this determination result. Thus, the toilet stool 800 is flushed as shown in FIG. 9C.

Also in this example, change in the amount or momentum of the water flow W2 (urine) may decrease the signal intensity of the sensing signal from the Doppler sensor 410. Thus, it may be difficult to determine the state of the water flow W2 stably by the method based on e.g. signal intensity. In contrast, in the embodiment, the state of the water flow can be determined relatively stably based on the phase information even if the signal intensity is changed by change in e.g. the momentum of the water flow W2. Thus, it can be accurately determined whether the user is urinating or has finished urination. For instance, the control section 420 can disable flushing performed by the toilet stool flushing unit 443 if the user M approaching the toilet stool 800 does not perform urination. This can save water.

FIGS. 13A to 13D are plan views illustrating the operation of an alternative wet area device according to the embodiment.

Figure 14:
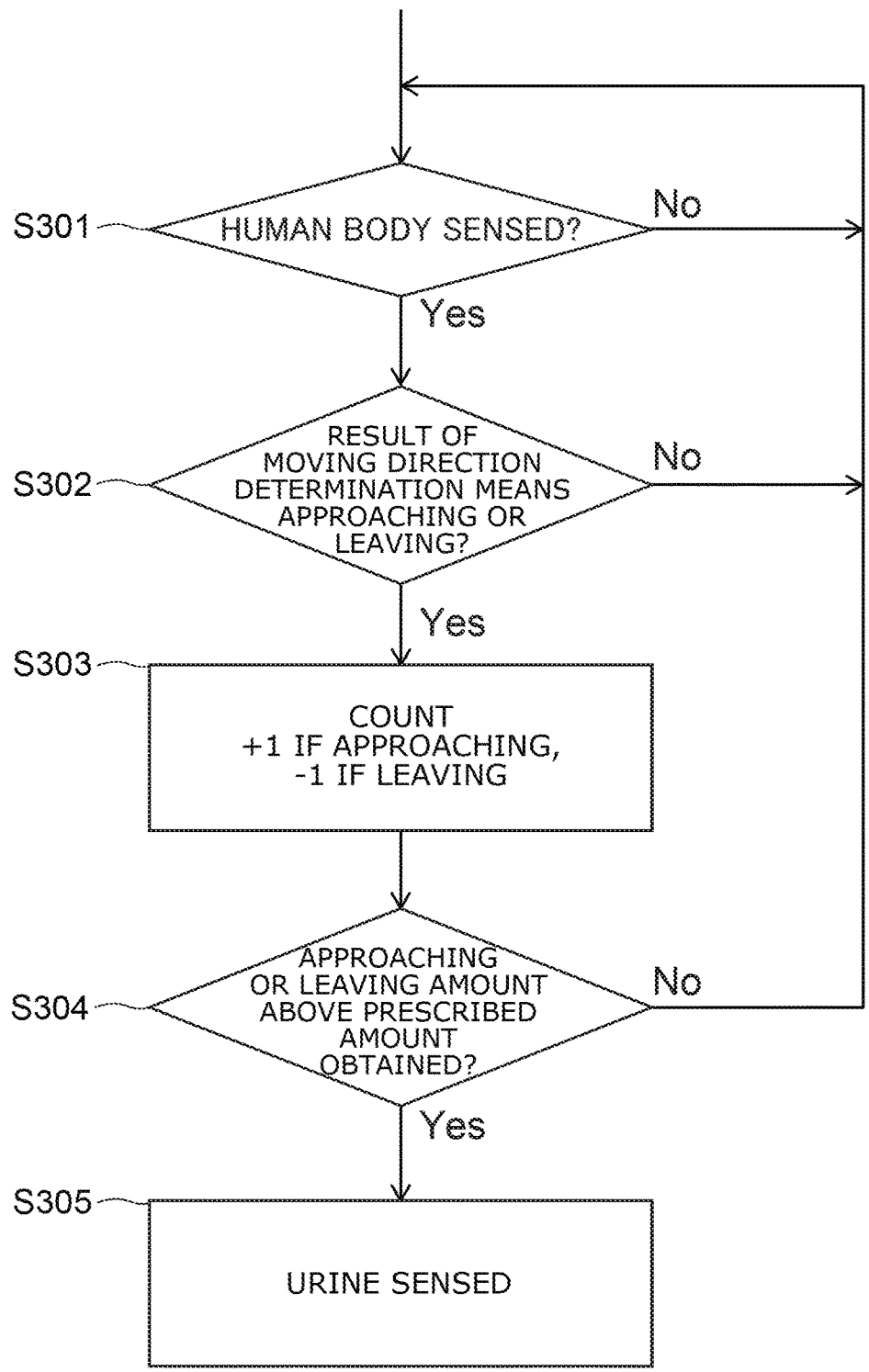
FIG. 14 is a flow chart illustrating the operation of the alternative wet area device according to the embodiment.
Figure 15:
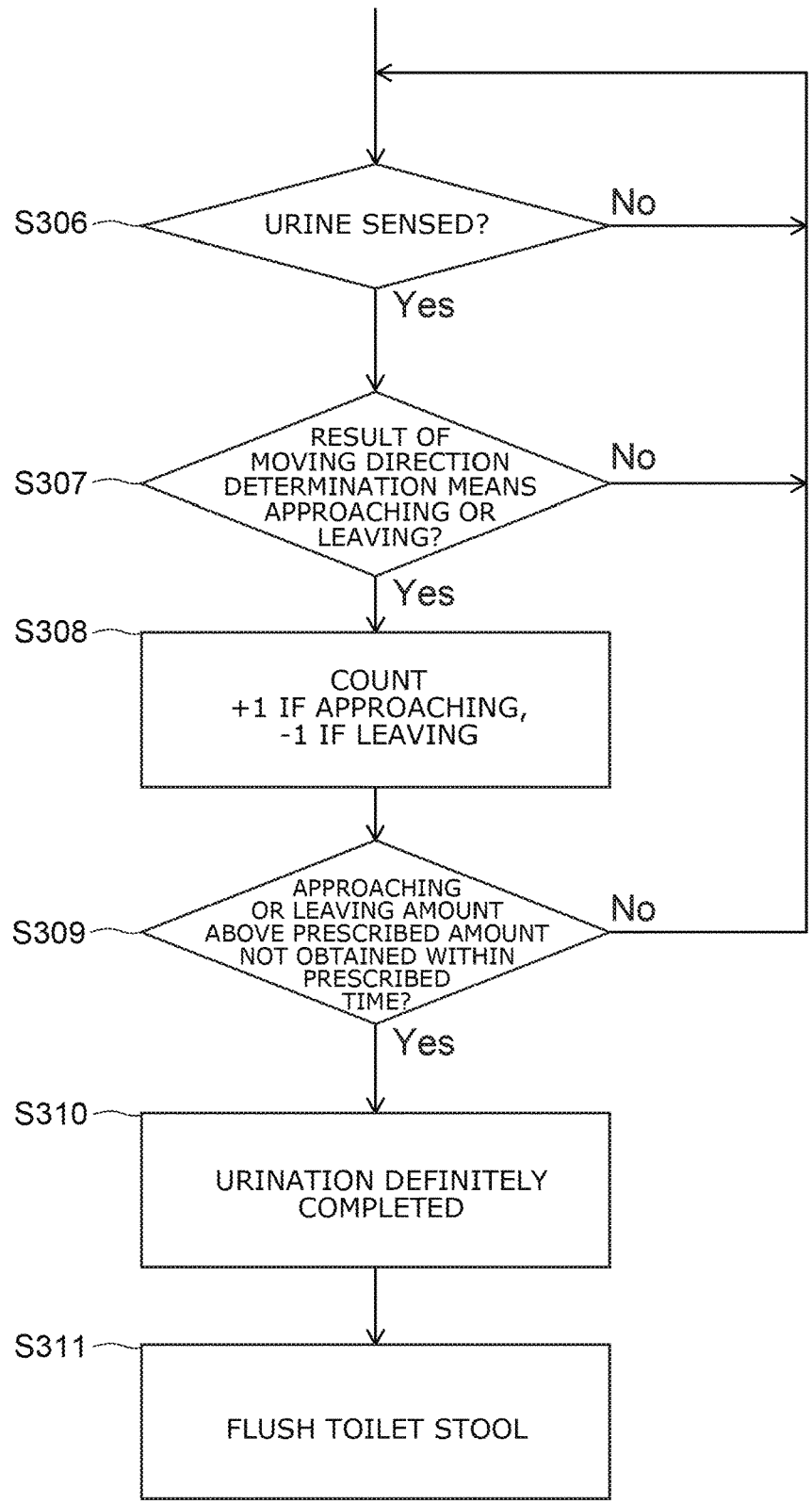
FIG. 15 is a flow chart illustrating the operation of the alternative wet area device according to the embodiment.

FIGS. 14 and 15 are flow charts illustrating the operation of the alternative wet area device according to the embodiment.

Figure 16:
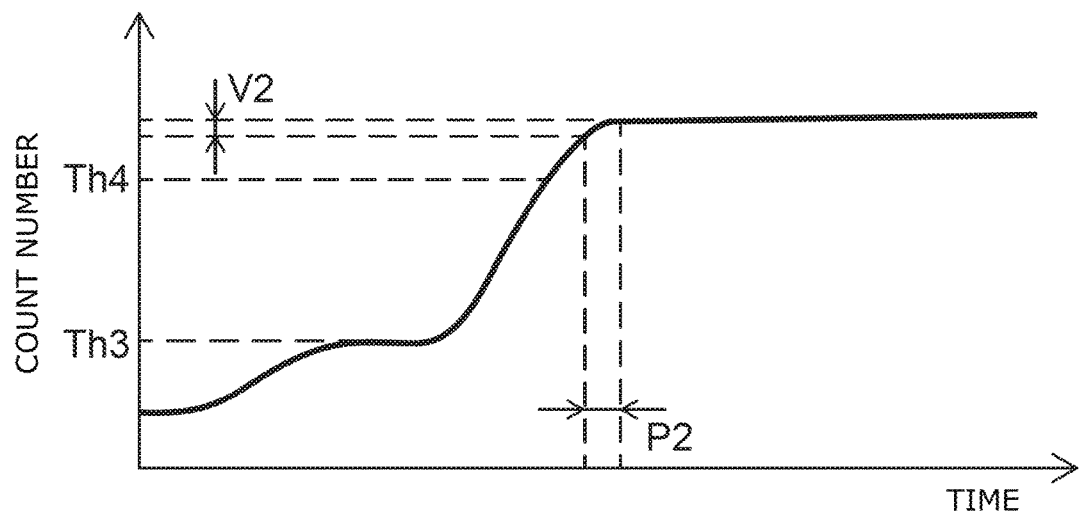
FIG. 16 is a graph illustrating the operation of the alternative wet area device according to the embodiment.

FIG. 16 is a graph illustrating the operation of the alternative wet area device according to the embodiment.

In the specific example with reference to FIGS. 13A to 16, the "wet area device" is a urinal 800b. The urinal 800b includes a Doppler sensor 410, a control section 420, and a controlled section 401b. The toilet stool flushing unit 443b of the controlled section 401b can flush the urinal 800b based on the control signal from the control section 420.

The user M stands in front of the urinal 800b and performs urination toward the urinal 800b. The Doppler sensor 410 outputs a sensing signal concerning the urine (water flow W3) of the user M. The control section 420 controls the operation of the toilet stool flushing unit 443b based on the sensing signal.

Figures 13A, 13B:
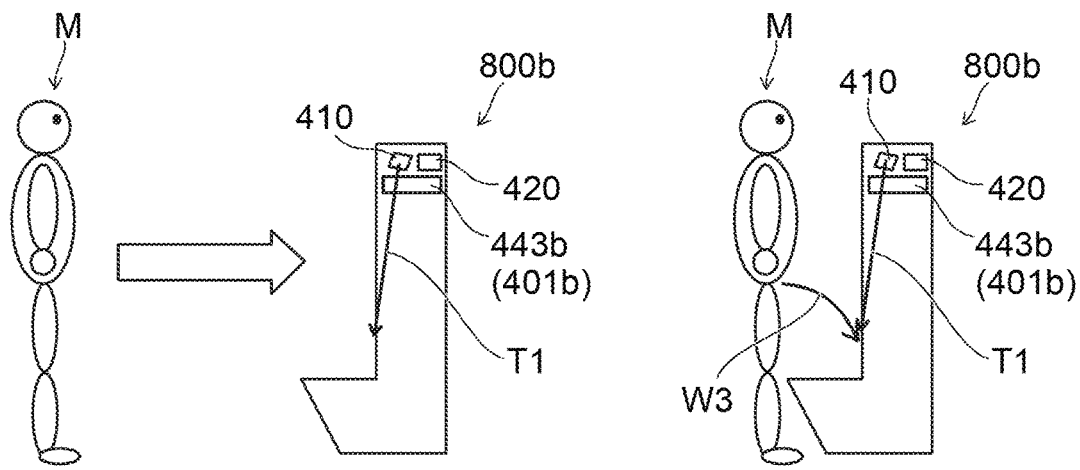
FIGS. 13A to 13D are plan views illustrating the operation of an alternative wet area device according to the embodiment.

As shown in FIGS. 13A to 13D, for instance, the Doppler sensor 410 is placed in the upper part of the urinal 800b and emits a transmission wave T1 obliquely downward. For instance, as shown in FIG. 13B, a water flow W3 (urine flow) from the user M may exist. The Doppler sensor 410 is placed so that (at least part of) the transmission wave T1 is reflected by the water flow W3 in this case. The Doppler sensor 410 emits a radio wave in the direction along the water flow W3. The traveling direction of (at least part of) the transmission wave T1 is not orthogonal to the flowing direction of the urine from the user M. The placement of the Doppler sensor 410 and the traveling direction of the transmission wave T1 as described above enable accurate determination of whether the direction of the water flow W3 is an approaching direction or a leaving direction.

For instance, as shown in FIG. 13A, the user M approaches the urinal 800*b*. Then, the Doppler sensor 410 receives a reflection wave from the user M. Thus, as described with reference to FIG. 4B, the count number increases in the counting means 195*a*. For instance, as shown in FIG. 16, when the count number becomes not less than a prescribed threshold Th3, the control section 420 determines that the user M has approached (human body sensed).

After approaching the urinal 800*b*, as shown in FIG. 13B, the user M jets a water flow W3, i.e., ejects urine. Then, the Doppler sensor 410 receives a reflection wave of the transmission wave T1 reflected by the water flow W3.

At this time, as shown in FIG. 14, in step S301, approaching of the user M is sensed. In step S302, the moving direction of the water flow W3 is determined based on the phase information. Then, in step S303, the counting means 195*a* adds 1 to the count number if approaching, and subtracts 1 from the count number if leaving. In this example, the direction of the water flow W3 is a direction approaching the Doppler sensor 410. Thus, the count number is incremented by 1.

In step S304, it is determined whether or not a change in the count number (approaching amount or leaving amount) by not less than a prescribed amount is obtained. In this example, it is determined whether or not the count number is not less than a threshold Th4. When the count number is smaller than the threshold Th4 (step S304, No), steps S301-S304 are repeated. The direction of the water flow W3 is a direction approaching the Doppler sensor 410. Thus, when ejection of urine of the user M is continued, the count number increases over time as shown in FIG. 16.

When the count number becomes not less than the threshold Th4 (step S304, Yes), it can be determined that the user M is ejecting urine (step S305).

As shown in FIG. 15, urination of the user M continues also after it is determined that the user M is performing urination (step S306, Yes). At this time, the Doppler sensor 410 further receives a reflection wave of the transmission wave T1 reflected by the water flow W3. Then, in step S307, the moving direction of the water flow W3 is determined based on the phase information. In step S308, the counting means 195*a* adds 1 to the count number if approaching, and subtracts 1 from the count number if leaving. In this example, the direction of the water flow W3 is a direction approaching the Doppler sensor 410. Thus, the count number is incremented by 1.

In step S309, it is determined whether or not a change in the count number (approaching amount or leaving amount) by not less than a prescribed amount is not obtained within a prescribed time. In this example, it is determined whether or not the increment per prescribed time P2 in the count number is not more than a threshold V2. When the increment per prescribed time P2 in the count number is larger than the threshold V2 (step S309, No), steps S306-S309 are repeated. Thus, as shown in FIG. 16, the count number further increases over time.

Figures 13C, 13D:
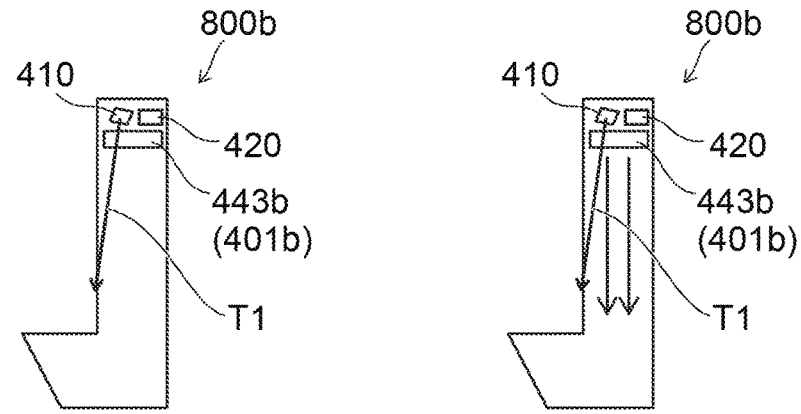

When the increment per prescribed time P2 in the count number becomes not more than the threshold V2 (step S309, Yes), the control section 420 can determine that urination of the user M is completed as shown in FIG. 13C (step S310). The control section 420 controls the operation of the toilet stool flushing unit 443*b* based on this determination result. Thus, the urinal 800*b* is flushed with water as shown in FIG. 13D.

Also in this example, the state of the water flow W3 can be determined relatively stably based on the phase information of the sensing signal of the Doppler sensor 410.

FIGS. 17A to 17D are plan views illustrating the operation of an alternative wet area device according to the embodiment.

Figure 18:
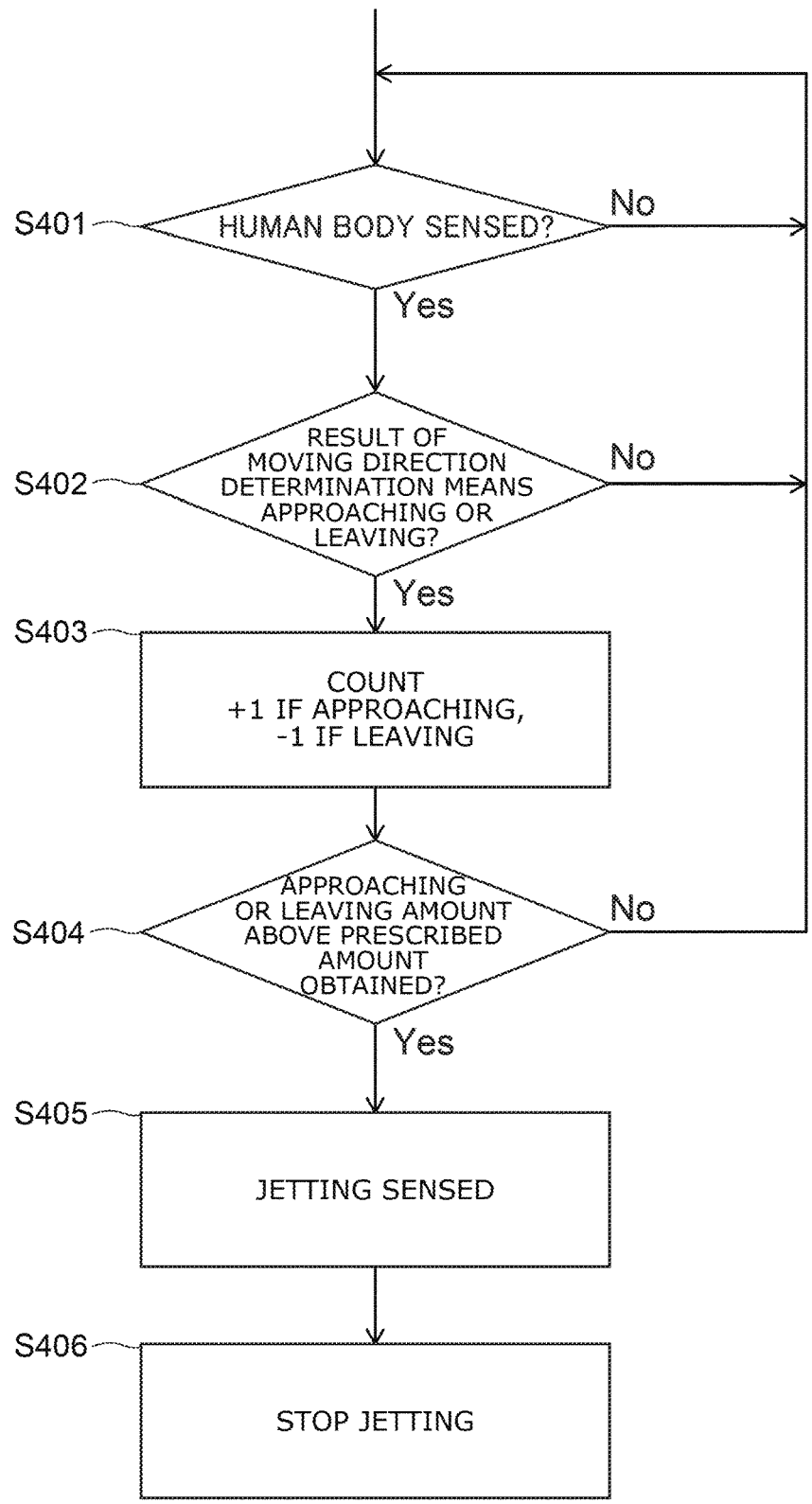
FIG. 18 is a flow chart illustrating the operation of the alternative wet area device according to the embodiment.

FIG. 18 is a flow chart illustrating the operation of the alternative wet area device according to the embodiment.

Figure 19:
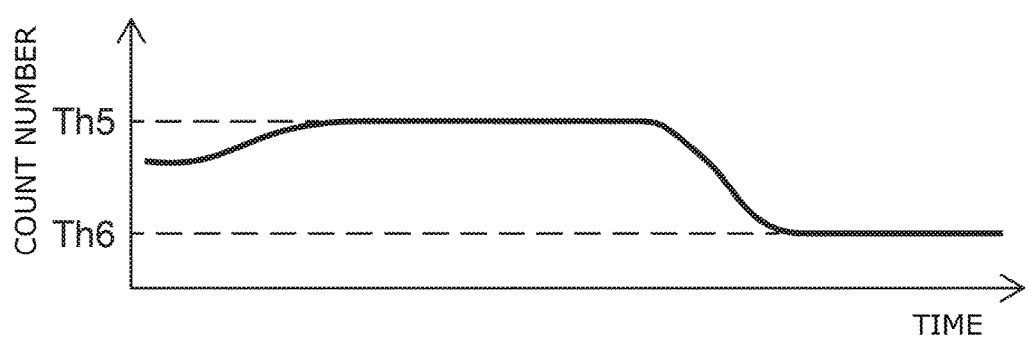
FIG. 19 is a graph illustrating the operation of the alternative wet area device according to the embodiment.

FIG. 19 is a graph illustrating the operation of the alternative wet area device according to the embodiment.

In the specific example with reference to FIGS. 17A to 19, the "wet area device" is an automatic water faucet device 900. The automatic water faucet device 900 includes a Doppler sensor 410, a control section 420, and a controlled section 401*c*. The jetting part 901 of the controlled section 401*c* performs jetting based on the control signal from the control section 420.

The user M stands in front of the automatic water faucet device 900 and stretches out the hands toward the jetting part 901. The control section 420 senses the hands of the user M by an arbitrary sensor and starts jetting from the jetting part 901. Subsequently, for instance, the user M finishes washing the hands, and the user's hands leave the jetting part 901. Then, the Doppler sensor 410 outputs a sensing signal concerning the flow of water (water flow W4) jetted from the jetting part 901. The control section 420 controls the operation of the jetting part 901 based on the sensing signal.

Figure 17A:
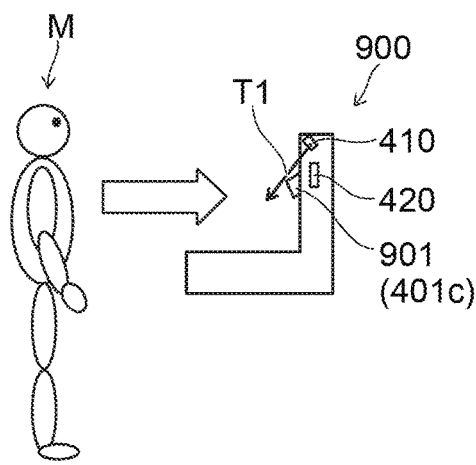
FIGS. 17A to 17D are plan views illustrating the operation of an alternative wet area device according to the embodiment.
Figure 17B:
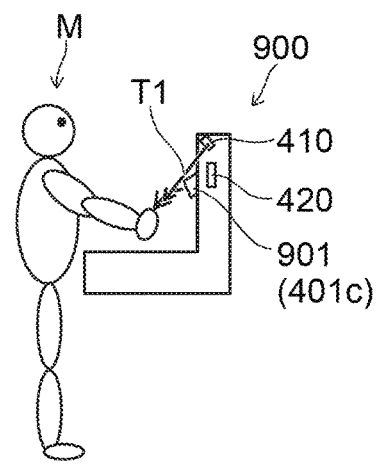
Figure 17C:
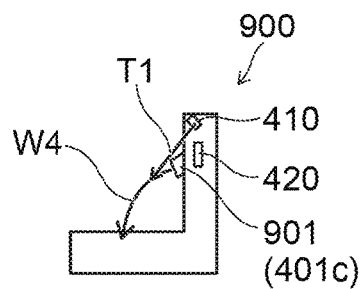
Figure 17D:
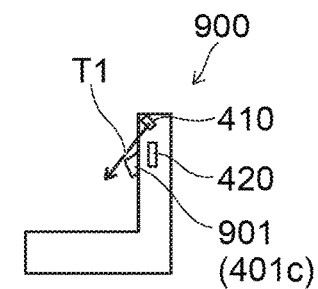

As shown in FIGS. 17A to 17D, the Doppler sensor 410 is provided above the jetting part 901 and emits a transmission wave T1 obliquely downward. For instance, as shown in FIG. 17C, a water flow W4 from the jetting part 901 may exist. The Doppler sensor 410 is placed so that (at least part of) the transmission wave T1 is reflected by the water flow W4 in this case. The Doppler sensor 410 emits a radio wave in the direction along the water flow W4. The traveling direction of (at least part of) the transmission wave T1 is not orthogonal to the flowing direction of the water from the jetting part 901. The placement of the Doppler sensor 410 and the traveling direction of the transmission wave T1 as described above enable accurate determination of whether the direction of the water flow W4 is a direction approaching or leaving the Doppler sensor 410.

For instance, as shown in FIG. 17A, the user M approaches the automatic water faucet device 900. Then, the Doppler sensor 410 receives a reflection wave from the user M. Thus, as described with reference to FIG. 4B, the count number increases in the counting means 195*a*. For instance, as shown in FIG. 19, when the count number becomes not less than a prescribed threshold Th5, the control section 420 determines that the user M has approached (human body sensed).

Subsequently, the user M stretches out the hands to the jetting part 901. Thus, as shown in FIG. 17B, the jetting part 901 performs jetting. For instance, while the user washes the hands, the water flow W4 and the transmission wave T1 are intercepted or scattered by the user's hands. Thus, the change in the count number is small. Subsequently, when the hands of the user M leave the jetting part 901, jetting from the jetting part 901 may be continued as shown in FIG. 17C. Then, the Doppler sensor 410 receives a reflection wave of the transmission wave T1 reflected by the water flow W4.

At this time, as shown in FIG. 18, in step S401, approaching of the user M is sensed. In step S402, the moving direction of the water flow W4 is determined based on the phase information. Then, in step S403, the counting means 195a adds 1 to the count number if approaching, and subtracts 1 from the count number if leaving. In this example, the direction of the water flow W4 is a direction leaving the Doppler sensor 410. Thus, the count number is decremented by 1.

In step S404, it is determined whether or not a change in the count number (approaching amount or leaving amount) by not less than a prescribed amount is obtained. In this example, it is determined whether or not the count number is not more than a threshold Th6. When the count number is larger than the threshold Th6 (step S404, No), steps S401-S404 are repeated. The direction of the water flow W4 is a direction leaving the Doppler sensor 410. Thus, when jetting of the jetting part 901 is continued, the count number decreases over time as shown in FIG. 19.

When the count number becomes not more than the threshold Th6 (step S404, Yes), it can be determined that jetting of the jetting part 901 is continued after the user has finished washing the hands (step S405). The control section 420 controls the jetting part 901 based on this determination result to stop jetting (step S406).

Also in this example, the state of the water flow W4 can be determined relatively stably based on the phase information of the sensing signal of the Doppler sensor 410.

The embodiments of the invention have been described above. However, the invention is not limited to the above description. Those skilled in the art can appropriately modify the design of the above embodiments. Such modifications are also encompassed within the scope of the invention as long as they include the features of the invention. For instance, the shape, dimension, material, layout and the like of each element such as the Doppler sensor 410, the control section 420 and the controlled section 401, and the installation configuration and the like of the Doppler sensor 410 are not limited to those illustrated, but can be suitably modified.

Furthermore, the elements of the above embodiments can be combined with each other as long as technically feasible. Such combinations are also encompassed within the scope of the invention as long as they include the features of the invention.

What is claimed is:

1. A wet area device comprising:
a radio wave sensor configured to output a sensing signal concerning a water flow;
a control section configured to determine a state of the water flow based on phase information of the sensing signal and to output a control signal based on a determination result; and
a controlled section configured to be controlled based on the control signal, wherein
the radio wave sensor emits a transmission wave and receives a reflection wave of the emitted transmission wave reflected by the water flow,
the radio wave sensor outputs an Ich signal by combining a part of the transmission wave and a part of the reflection wave,
the radio wave sensor outputs a Qch signal by combining a part of the transmission wave and a part of the reflection wave which is shifted in phase,
the control section extracts a first signal concerning a standing wave from the Ich signal,
the control section extracts a second signal concerning a standing wave from the Qch signal, and
the sensing signal includes the first signal and the second signal different in phase from the first signal,
the phase information is based on a difference between the phase of the first signal and the phase of the second signal.

2. The device according to claim 1, wherein
the water flow is a flow of water jetted from a human body or the controlled section,
the radio wave sensor emits the transmission wave in a direction along a direction of the water flow, and
the control section determines whether the direction of the water flow is a direction toward the radio wave sensor or a direction away from the radio wave sensor, and controls operation of the controlled section based on the determined direction of the water flow.

3. The device according to claim 1, wherein
the controlled section includes a nozzle having a jetting port, and
the water flow is a flow of water jetted from the jetting port.

4. The device according to claim 3, wherein upon determining that the water flow is jetted from the jetting port, the control section controls the controlled section so as to stop jetting from the jetting port.

5. The device according to claim 1, further comprising:
a toilet stool,
wherein the water flow is a flow of urine of a user jetted to the toilet stool.

6. The device according to claim 5, wherein the control section determines the state of the flow of urine jetted from the user and controls the controlled section based on the determination result of the flow of urine.

* * * * *

UNITED STATES PATENT AND TRADEMARK OFFICE
CERTIFICATE OF CORRECTION

PATENT NO. : 10,267,025 B2
APPLICATION NO. : 15/460395
DATED : April 23, 2019
INVENTOR(S) : Yuta Tanogashira et al.

Page 1 of 1

It is certified that error appears in the above-identified patent and that said Letters Patent is hereby corrected as shown below:

In the Specification

Column 5, Line 14, "SO" should be -- S0 --.

Column 5, Line 43, "SO" should be -- S0 --.

Column 5, Line 46, "SO" should be -- S0 --.

Column 5, Line 55, "SO" should be -- S0 --.

Column 8, Line 67, "SO" should be -- S0 --.

Column 11, Line 63, "FIG. 12" should be -- FIG. 12. --.

Signed and Sealed this
Tenth Day of September, 2019

Andrei Iancu
*Director of the United States Patent and Trademark Office*